United States Patent Office

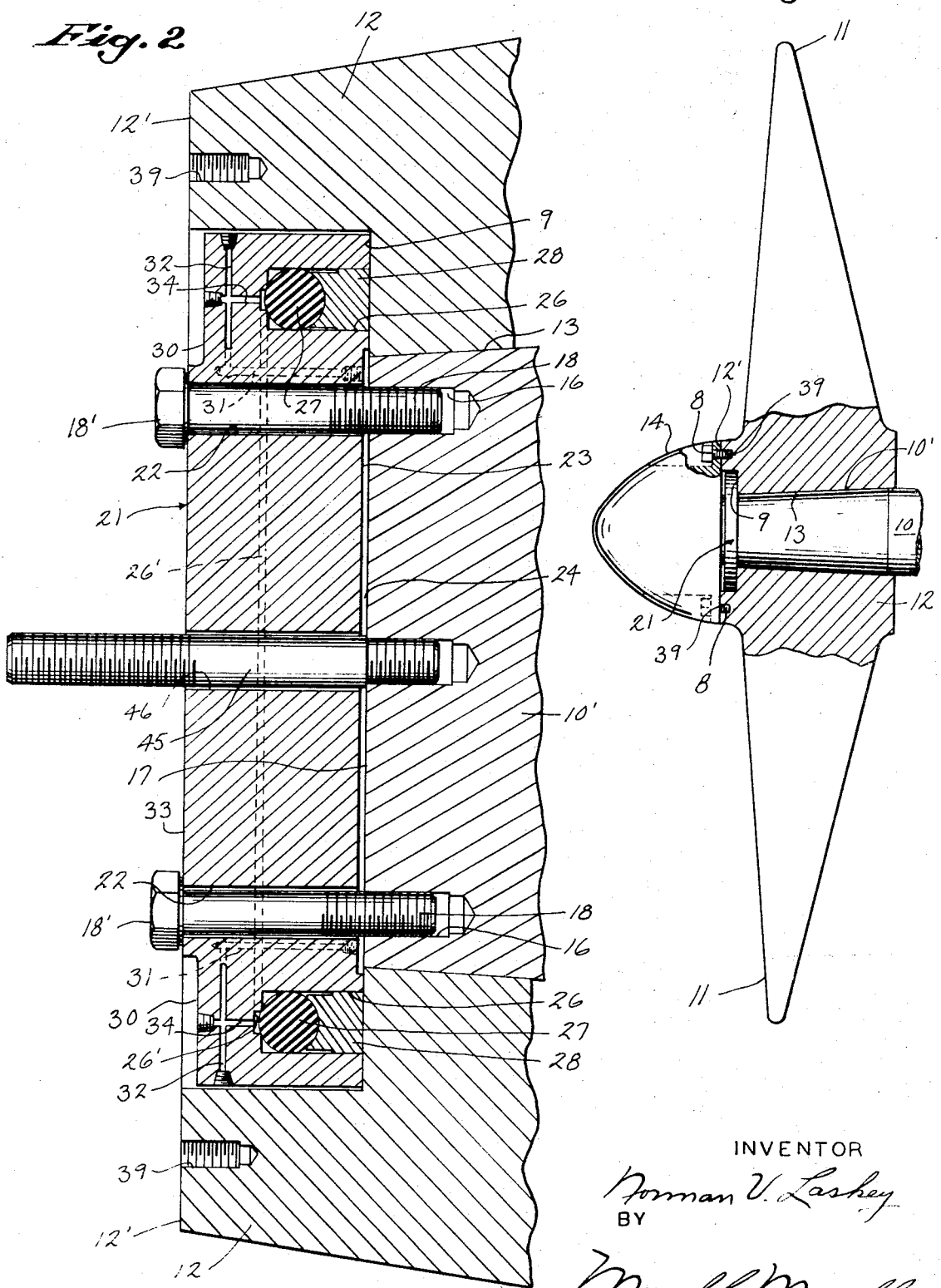

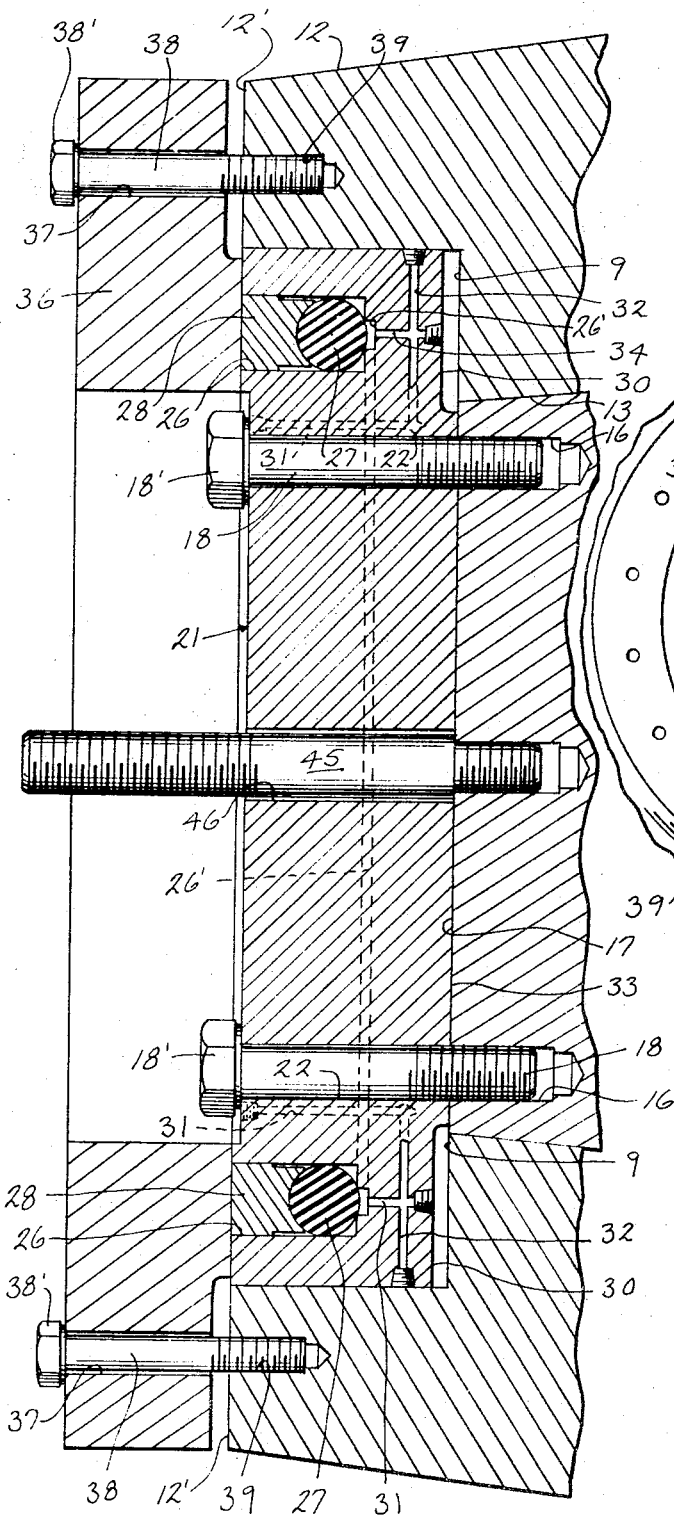
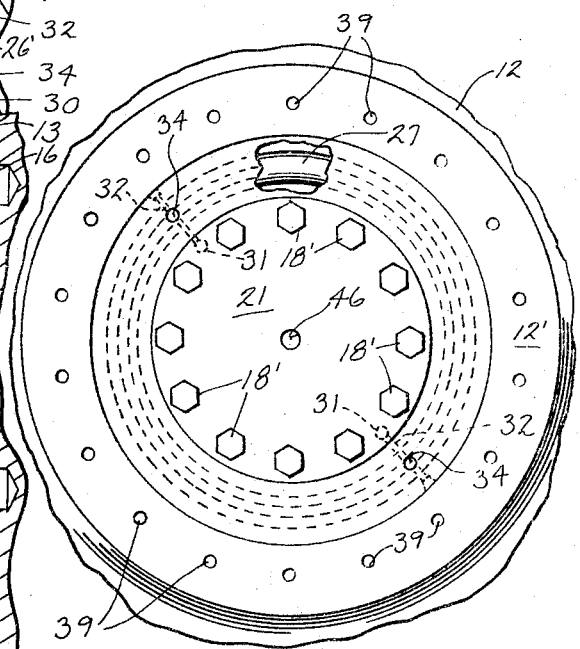

3,549,275
Patented Dec. 22, 1970

3,549,275
SHIP'S PROPELLER SECURING AND JACKING MEANS
Norman V. Laskey, Montreal, Quebec, Canada, assignor to Waukesha Bearings Corporation, Waukesha, Wis., a corporation of Wisconsin
Filed Nov. 14, 1968, Ser. No. 775,785
Int. Cl. B63h 1/20
U.S. Cl. 416—245    8 Claims

ABSTRACT OF THE DISCLOSURE

To removably secure a ship's propeller on a tapered propeller shaft there is provided a securing plate adapted to be bolted to the end of said shaft and having jacking means in the form of a hydraulically-actuated annular piston for forcing said propeller into tight wedging engagement on said tapered shaft, and which plate can be removed and mounted in a reverse position for coaction with a withdrawing ring adapted to be bolted to the propeller hub to forcibly disengage and remove said propeller when desired, said securing plate fitting within a special recess in the propeller hub.

BACKGROUND OF THE INVENTION

Field of the invention

The present invention relates more particularly to the mounting and removal of propellers on the tapered propeller shafts of ships, and may have broader application in the mounting and removal of other massive parts on tapered shafts.

Description of the prior art

In U.S. Pat. Nos. 3,358,772 and 3,228,482 there are disclosed propeller-securing assemblies for ships including sleeves adapted to be force-fitted on the tapered end portion of a propeller shaft and retained thereon by means of a nut threaded onto a tailshaft extension, there being hydraulically-actuated annular jacking pistons in the nut or sleeve to facilitate the installation and removal of the propeller.

Such prior hydraulic mounting devices have been subject to the objection that the elongated threaded tailshaft extension adds substantially to the cost, and increases the overhanging weight which must be supported by the tailshaft. Furthermore, it is necessary for the workmen to handle large and cumbersom spanner wrenches when installing or removing the nuts of the prior assemblies.

SUMMARY OF THE INVENTION

In accordance with the present invention there is provided a propeller-mounting plate wherein the necessity for an elongated threaded shaft extension and retaining nut are eliminated, the plate being secured in position by studs.

A further object of the present invention is to provide a propeller-securing plate in which hydraulic jacking means for forcibly wedge-mounting and removing the propeller may be conveniently incorporated.

A further object of the invention is to provide an improved propeller mounting plate which can be accommodated in the counter-bored end of the hub of the propeller.

A further object of the invention is to provide a device as above described which materially shortens the time required to fit a propeller and secure it in place.

A further object of the invention is to provide an improved construction which makes it possible for the end of the propeller to be flush with the inner end of the cone or fairwater cap, it also being possible to have a shorter fairwater cap.

Still further objects and advantages of the improved propeller-securing and jacking plate are that it is simple to install and remove, reliable in operation, rugged and durable in construction, and it is otherwise particularly well adapted for its intended purposes.

BRIEF DESCRIPTION OF THE DRAWING

In the accompanying drawings, wherein the same reference numerals designate the same or similar parts in all of the views:

FIG. 1 is a side elevational view of a ship's propeller assembly featuring the present invention, parts being broken away and shown in section;

FIG. 2 is an enlarged vertical sectional view showing the securing and jacking plate in its propeller-installing and retaining position;

FIG. 3 is a similar enlarged sectional view showing the plate reversed and associated with a withdrawal ring for the removal of a propeller; and FIG. 4 is a view looking toward the end of the structure of FIG. 2, showing said propeller-securing and jacking plate in assembled position.

DESCRIPTION OF THE PREFERRED EMBODIMENT

Referring now more particularly to FIG. 1 of the drawing, the numeral 10 designates a conventional ship's propeller tailshaft, which is tapered in an aft direction as shown as 10', and mounted thereon is a propeller 11 including a hub 12 having a tapered internal bore 13 therethrough (FIGS. 2 and 3), there being a circle of spaced, tapped holes 39 adjacent the periphery of the hub in the end thereof. Within the circle of holes 39, the end of the hub has a circular recess 9. The propeller 11 is adapted to be tightly wedge-fitted onto said tapered propeller shaft 10 to provide a reliable drive connection. Mounted aft of the propeller 11 is a fairwater cap 14 which is removably secured in position by bolts 8 threaded into the tapped holes 39 of the propeller hub as shown in FIG. 1.

The tight wedge-mounting of a ship's propeller on its propeller shaft, as well as the removal of said propeller for inspection or repair, has long presented a problem in the shipbuilding art. The purpose of the devices disclosed in prior U.S. Pats. Nos. 3,358,772 and 3,228,482 was to provide means for hydraulically jacking a propeller into tight, wedging engagement on the propeller shaft, and for retaining the same in said position during operation of the ship, as well as to provide means for forcibly disengaging said propeller to facilitate its removal for inspection or repair. Such devices have proven to be a great aid in the installation and removal of propellers but have heretofore required an overhanging, threaded tailshaft extension on the propeller shaft which is expensive and produces undesirable overhanging weight.

In accordance with the improved propeller-securing means of the present invention, and referring now more particularly to FIG. 2 of the drawing, the propeller tailshaft 10 is provided with a plurality of tapped holes 16 opening in its end face 17 and extending axially inwardly therefrom. Mounted on said end face 17 is a disc-like member or plate 21 which is removably secured thereto by means of bolts or cap screws 18 passed through bores 22 in said disc and threaded into said tapped holes 16 in the end of the shaft, the enlarged heads 18' of said bolts bearing against the outer face of the plate 21. As will be seen in FIG. 4, in the illustrated embodiment of the invention there are twelve of said retaining bolts or cap screws 18 arranged in circumferentially spaced relationship.

Referring again to FIG. 2 of the drawings, the plate 21 is of a diameter substantially greater than the diameter of the abutting end of the drive shaft 10, but less than the diameter of the surrounding propeller hub 12 to fit in the recess 9 and be flush with the end of the hub as shown in FIGS. 1 and 2. The inner face 23 of said plate 21 is provided with a clearance recess 24 of greater diameter than the end of the tailshaft, and formed in the face 23 of said plate adjacent the periphery thereof is a concentric annular groove 26, said groove opening against the abutting end of the propeller hub 12 when the parts are in the condition of FIG. 2. The opposite face 33 of said disc member 21 is provided with an annular cutout portion 30 adjacent the periphery thereof, the function of which will be disclosed hereafter.

Fitted snugly within the bottom of the annular groove 26 is a flexible ring 27 of suitable rubber or rubber-like material such as nitrile rubber, and axially-movably carried within said groove and adapted to be projected outwardly therefrom is a steel loading ring 28 designed to function as an annular piston, as will be hereinafter seen.

Extending inwardly from the face 23 of the plate 21 are ducts 31 for hydraulic fluid communicating with radial fluid ducts 32, and extending axially inwardly from the opposite face 33 of said disc are ducts 34, each intersecting a radial duct 32 and providing communication between said fluid ducts and the bottom of the annular groove 26. The outer end portions of said fluid ducts 31, 32 and 34 are enlarged and tapped to permit plugs to be removably screwed therein, one of which may be removed to receive the nozzle of a grease gun.

When it is desired to install a propeller on a ship, the fairwater cap 14 being removed, the propeller is mounted on the tapered end portion 10' of the propeller shaft. Said propeller is manually urged forwardly on the tapered shaft until the propeller hub is as far forwardly on said shaft as can be accomplished manually. The securing plate 21 is then installed in the hub recess 9, with its peripheral portion bearing against the bottom of said recess. During such installation the central stud 45, which coacts with a central bore 46 in the securing plate 21, is employed as a guide, this also being used when the disc 21 is being reversed for a widthdrawal operation as will be hereinafter described. The disc 21 is secured in position by means of bolts 18 (FIG. 2) or the like which are passed through the plate apertures 22 and threaded into the tapped holes 16 in said shaft 10. As appears in FIG. 2, the annular piston 28 carried by said plate 21 abuts the bottom of the recess 9 in the propeller hub 12.

A grease gun or other source of hydraulic fluid under pressure is then inserted in the entrance opening of one of the ducts 34 in the disc member 21, the other duct openings being closed by plugs or the like, and hydraulic fluid is introduced under pressure into the bottom of the annular groove 26 through the circular fluid groove 26'. Said pressurized hydraulic fluid acts against the ring 27, which may be Buna-N rubber having a durometer of 80–90, and causes the latter to forcibly urge the annular piston or loading ring 28 outwardly against the bottom of the recess 9 of the propeller hub 12. The pressure head sustained by the grease gun or other fluid source is preferably at least 10,500 pounds per square inch, with the result that the forwardly-extending annular piston 28 forcibly shifts the propeller 11 forwardly into tight, wedge-fitting engagement on the tapered propeller tailshaft 10. Thus there is provided a hydraulic mounting device which not only provides a tighter, more secure propeller installation than can be obtained manually, or with conventional tools, but which is also considerably faster and easier.

After the propeller has been installed as described, the end cone or so-called fairwater cap 14 may be reconnected, by threading the bolts 8 into the tapped holes 39 of the hub. By having the plate 21 recessed into the end of the propeller hub as shown in FIGS. 1 and 2 the fairwater cap may fit directly against the propeller hub, thereby shortening the overall assembly, the usual overhanging threaded tailshaft extension for receiving a propeller-securing nut being eliminated with the present invention.

To remove the propeller 11, when necessary to inspect or replace the same, the end cap 14 is removed, the retaining bolts 18 are removed, and the plate 21 is reversed. After such reversal the bolts 18 may be reinserted as in FIG. 3, but this is not necessary for withdrawal. As appears in FIG. 3 of the drawing, the plate 21 is positioned with its opposite face 33 in abutting relation against the inner end 17 of the propeller shaft 10, the aforementioned annular recess 30 of the plate 21 being adjacent but spaced from the bottom of the groove 9 of the propeller hub.

A withdrawal ring 36 is then positioned against the plate 21, said ring having a central opening permitting access to one of the fluid duct openings 31, the outer diameter of said ring being greater than the diameter of said plate 21. Said ring 36 is provided with a ring of spaced bolt holes 37 adjacent its periphery alignable with the aforementioned tapped holes 39 in the end face 12' of the hub 12, and bolts 38 or the like are passed through said holes 37 and threaded into said tapped hub holes 39 to tightly clampingly secure said ring and plate against the face 17 of the propeller shaft.

To loosen and remove the propeller 11 from its tight, wedge-fitting mounting on the propeller shaft, a grease gun or other hydraulic fluid source is coupled to one of the ducts 31, the other ducts being closed by threaded plugs, and fluid under pressure is directed into the bottom of the annular groove 26 by way of the fluid groove 26'. Said pressurized hydraulic fluid acts upon the rubber ring 27, and said rings acts against the annular piston 28 and causes the latter to move axially outwardly. As said piston 28 is extended it forcibly pushes the ring 36 axially outwardly, and due to the connection of the latter to the propeller hub 12, by the bolts 38, said propeller 11 is pulled outwardly therewith, thereby freeing said propeller from its wedging engagement on the tapered propeller shaft 10. This movement is permitted because of the space clearance provided by the annular recess 30 in the plate 21. The bolts 38 can then be withdrawn, the withdrawal ring 36 and securing plate 21 remroved, and the propeller removed from the propeller shaft. Thus a propeller-securing means has been provided whereby hydraulic pressure may be used both to aid in mounting the propeller and in removing the same, and these advantages may be obtained without employing a nut on a threaded tailshaft extension as is necessary in prior art such as in the construction of Pat. No. 3,358,772.

With the present invention the propeller-securing plate 21 is entirely accommodated within a recess in the end of the propeller hub and is held in position by bolts threaded into the tailshaft. The result of this arrangement is to shorten the overall assembly and eliminate the necessity of having the heavy threaded tailshaft extension to receive the conventional propeller-holding nut. It is therefore unnecessary for workers to wield the extremely heavy spanner wrenches usually required in tightening and loosening the conventional tailshaft nuts.

What I claim is:

1. In a mounting assembly for a propeller for a large ship in which there is a tailshaft having a tapered end portion with an end face, in which there is a massive propeller element having a hub with a tapered bore for said tapered shaft end, the improvement comprising having the tailshaft end in non-projecting relationship with respect to the adjacent end of the propeller hub; a strong, relatively thick and flat securing and jacking plate of greater area than the end face of the tailshaft, having an inner face which is positioned closely adjacent the end face of the tailshaft and having a surrounding portion overlapping a portion of said hub; tapped bolt holes in said end face of the tailshaft; said securing plate having bolt holes aligned with said tapped holes; bolts extending removably through said bolt holes and into said tapped holes removably securing the plate to said end face of the shaft; and fluid pressure operated means in the hub-overlapping portion of the plate positioned to act on said hub to force said massive propeller element into position on the tapered shaft end when subjected to the action of fluid under pressure, said hub-overlapping portion having sufficient thickness to accommodate said fluid pressure operated means, and the portion of the plate which is adjacent the shaft end having sufficient thickness and strength to withstand the stresses encountered while the propeller is being thus forced into position.

2. A mounting assembly as claimed in claim 1 in which the inner face of the securing and jacking plate has a clearance recess of larger size than the end of the tailshaft.

3. A mounting assembly as claimed in claim 1 in which the hub of the propeller has a recessed end portion which projects beyond the end face of the tailshaft, and in which the securing plate is accommodated in the end recess of the hub.

4. A mounting assembly as claimed in claim 3 in which the end face of the tailshaft is substantially flush with the bottom of the hub recess.

5. A mounting assembly as claimed in claim 3 in which the outer face of the securing plate is substantially flush with the outer end of the hub.

6. A mounting assembly as claimed in claim 1 in which the securing and jacking plate has oppositely-disposed, interchangeable faces, and is reversible in position, and in which the hub has an end face with tapped holes; a withdrawing ring positioned adjacent said end face of the hub and having a circular portion adapted to contact the hub-overlapping portion of the securing and jacking plate when the latter is reversed in position; and bolts in said tapped holes of the hub removably securing said withdrawing ring to the end face of the hub whereby, with the securing plate reversed in position, the fluid pressure operated means in the securing and jacking plate will act on the withdrawing ring to force the hub out of wedging engagement with the tapered shaft end, there being a surrounding recess between the hub-overlapping portion of the securing plate and the hub when the plate is reversed to provide clearance room for said withdrawal movement.

7. A mounting assembly as set forth in claim 1 in which there is a tapped opening in the center of the end of the tailshaft removably holding a guiding stud, and in which the plate has a central hole for receiving said stud whereby the stud will guide the plate into position.

8. A mounting assembly as claimed in claim 3 in which the securing and jacking plate has oppositely-disposed, interchangeable faces, and is reversible in position, and in which the hub has an end face with tapped holes; a withdrawing ring positioned adjacent said end face of the hub and having a circular portion adapted to contact the hub-overlapping portion of the securing and jacking plate when the latter is reversed in position; and bolts in said tapped holes of the hub removably securing said withdrawing ring to the end face of the hub whereby, with the securing plate reversed in position, the fluid pressure operated means in the securing and jacking plate will act on the withdrawing ring to force the hub out of wedging engagement with the tapered shaft end, there being a surrounding recess between the hub-overlapping portion of the securing plate and the hub when the plate is reversed to provide clearance room for said withdrawal movement.

References Cited

UNITED STATES PATENTS

| 3,097,003 | 7/1963 | Deve et al. | 170—160.23(H)UX |
| 3,358,772 | 12/1967 | Bunyan | 170—173(H) |
| 3,444,932 | 5/1969 | Wlezien | 170—173(H)X |

FOREIGN PATENTS

| 143,678 | 10/1963 | Russia | 170—173(H) |

EVERETTE A. POWELL, Jr., Primary Examiner

U.S. Cl. X.R.

416—146, 244